US008699880B2

(12) United States Patent
Grigoryan et al.

(10) Patent No.: US 8,699,880 B2
(45) Date of Patent: Apr. 15, 2014

(54) OPTICAL TRANSCEIVERS FOR USE IN FIBER OPTIC COMMUNICATION NETWORKS

(75) Inventors: Vladimir S. Grigoryan, Elkridge, MD (US); Michael Y. Frankel, Baltimore, MD (US); Michael J. Wingrove, Kanata (CA)

(73) Assignee: Ciena Corporation, Hanover, MD (US)

( * ) Notice: Subject to any disclaimer, the term of this patent is extended or adjusted under 35 U.S.C. 154(b) by 339 days.

(21) Appl. No.: 13/165,324

(22) Filed: Jun. 21, 2011

(65) Prior Publication Data
US 2011/0255870 A1 Oct. 20, 2011

Related U.S. Application Data

(63) Continuation-in-part of application No. 12/691,474, filed on Jan. 21, 2010, now Pat. No. 8,498,542.

(51) Int. Cl.
*H04J 14/06* (2006.01)
*H04B 10/00* (2013.01)
*H04B 10/12* (2011.01)
*H04B 10/06* (2011.01)

(52) U.S. Cl.
USPC .............. 398/65; 398/152; 398/184; 398/205

(58) Field of Classification Search
USPC .................... 398/65, 152, 184, 205
See application file for complete search history.

(56) References Cited

U.S. PATENT DOCUMENTS

| 4,831,662 | A * | 5/1989 | Kuhn | 398/192 |
|---|---|---|---|---|
| 7,606,498 | B1 * | 10/2009 | Wu et al. | 398/152 |
| 8,064,767 | B2 * | 11/2011 | Shpantzer et al. | 398/65 |
| 2002/0003641 | A1 * | 1/2002 | Hall et al. | 359/122 |
| 2004/0016874 | A1 * | 1/2004 | Rao et al. | 250/225 |
| 2004/0114939 | A1 * | 6/2004 | Taylor | 398/152 |
| 2004/0204100 | A1 * | 10/2004 | Braithwaite | 455/561 |
| 2005/0019042 | A1 * | 1/2005 | Kaneda et al. | 398/208 |
| 2005/0265727 | A1 * | 12/2005 | Glingener | 398/152 |
| 2007/0280689 | A1 * | 12/2007 | Boffi et al. | 398/65 |
| 2008/0232816 | A1 * | 9/2008 | Hoshida et al. | 398/152 |
| 2009/0169208 | A1 * | 7/2009 | Grigoryan et al. | 398/65 |
| 2009/0196602 | A1 * | 8/2009 | Saunders et al. | 398/26 |
| 2010/0014873 | A1 * | 1/2010 | Bulow | 398/159 |

(Continued)

OTHER PUBLICATIONS

M. Nazarathy, D.M. Marom, W. Shieh; "Optical comb and filter bank (de)mux enabling 1 Tb/s orthogonal sub-band multiplexed CO-OFDM free of ADC/DAC limits"; European Conference on Optical Communications (ECOC) 2009, paper P3.12, Sep. 2009 (IEEE).

(Continued)

*Primary Examiner* — Ken Vanderpuye
*Assistant Examiner* — Abbas H Alagheband
(74) *Attorney, Agent, or Firm* — Clements Bernard PLLC; Christopher L. Bernard; Lawrence A. Baratta, Jr.

(57) ABSTRACT

The present disclosure provides a polarization multiplexed transceiver, including: a transmitter; a receiver; circuitry within the transmitter configured to insert pilot tones as a reference state of polarization for a polarization multiplexed signal; and circuitry within the receiver configured to de-multiplex the polarization multiplexed signal using the pilot tones. The transmitted signal is constructed in such a manner as to facilitate the division of the receiver processing between the analog and digital domains such that the implementation may be simultaneously both highly spectrally efficient and power efficient.

20 Claims, 8 Drawing Sheets

(56) References Cited

U.S. PATENT DOCUMENTS

| | | | | |
|---|---|---|---|---|
| 2010/0028011 A1* | 2/2010 | Kaneda et al. | ............... | 398/115 |
| 2010/0086303 A1* | 4/2010 | Qian et al. | ..................... | 398/65 |
| 2010/0098411 A1* | 4/2010 | Nakashima et al. | ............ | 398/25 |
| 2010/0178057 A1* | 7/2010 | Shieh | ............................ | 398/79 |
| 2011/0051215 A1* | 3/2011 | Zhou | ............................ | 359/238 |

OTHER PUBLICATIONS

J. Sewter et al.; "A 3-Tap FIR Filter With Cascaded Distributed Tap Amplifiers for Equalization Up to 40 Gb/s in 0.18-um CMOS"; IEEE Journal of Solid-State Circuits, vol. 41, No. 8, Aug. 2006, p. 1919.

Yan Tang and William Shich, Members IEEE; "Coherent Optical OFDM Transmission UP to 1 Tb/s per Channel"; Journal of Lightwave Technology, vol. 27, No. 16, Aug. 15, 2009.

Pierre Siohan (Member IEEE), Cyrille Siclet, and Nicolas LaCaille; "Analysis and Design of OFDM/OQAM Systems Based on Filterbank Theory"; IEEE Transactions on Signal Processing, vol. 50, No. 5, May 2002.

Jinfeng Du, and Svante Signell, Senior Member, IEEE; Pulse Shape Adaptivity in OFDM/OQAM Systems; Communications Dept., School of Informational and Communication Technology, KTH—Royal Institute of Technology, Stockholm, Sweden, Feb. 2007.

Takayuke Kobayashi, Member IEEE, Akihide Sano, Ejichi Yamada, Member IEEE, Eiji Yoshida, and Yutaka Miyamoto, Member IEEE; Over 100 Gb/s Electro-Optically Multiplexed OFDM for High-Capacity Optical Transport Network; Journal of Lightwave Technology, vol. 27, No. 16, Aug. 2009.

Jinfeng Du, Savante Signell; "Classic OFDM Systems and Pulse Shaping OFDM/OQAM Systems"; Electronic, Computer, and Software Technology KTH—Royal Institute of Technology, Stockholm, Sweden; Feb. 2007.

Gilad Goldfarb, Guifang Li, and Michael G. Taylor, Member, IEEE; "Orthogonal Wavelength-Division Multiplexing Using Coherent Detection"; IEEE Photonics Technology Letters, vol. 18, No. 24, Dec. 15, 2007.

W. Shich, H. Bao, and Y. Tang; "Coherent Optical OFDM: Theory and Design"; Optics Express 841, vol. 16, No. 2, Jan. 21, 2008; Melbourne, AU.

A.D. Ellis, F.C.G. Gunning, B. Cuenot, T.C. Healty, E. Pincemin; "Towards 1TbE Using Coherent WDM"; Tyndall National Institute and University College Cork Dept of Physcis, Cork, Ireland; Downloaded by Ciena on Oct. 12, 2008.

M. Nazarathy, D.M. Marom, W. Shieh; "Optical comb and filter bank (de)mux enabling 1 Tb/s orthogonal sub-band multiplexed CO-OFDM free of ADC/DAC limits"; European Conference on Optical Communications (EOC) 2009; paper P3.12, Sep. 2009.

J. Seweter, et al.; "A 3-Tap FIR Filter With Cascaded Distributed Tap Amplifiers for Equalization Up to 40 Gb/s in 0.18-um CMOS"; IEEE Journal of Solid-State Circuits, vol. 41, No. 8, Aug. 2006, p. 1919.

* cited by examiner

OPTICAL TRANSCEIVERS FOR USE IN FIBER OPTIC COMMUNICATION NETWORKS

CROSS-REFERENCE TO RELATED APPLICATION

The present disclosure is a continuation-in-part of U.S. patent application Ser. No. 12/691,474, filed on Jan. 21, 2010, now U.S. Pat. No. 8,498,542 and entitled "MULTI-CHANNEL OPTICAL TRANSCEIVER WITH OFFSET QUADRATURE AMPLITUDE MODULATION," the contents of which are incorporated in full by reference herein.

FIELD OF THE DISCLOSURE

The present disclosure relates generally to optical transceivers for use in fiber optic communication networks. More specifically, the present disclosure relates to low power, coherent optical transceivers utilizing the self demultiplexed detection of polarization multiplexed signals.

BACKGROUND OF THE DISCLOSURE

Fiber optic communication networks are experiencing rapidly increasing capacity growth. This capacity growth is reflected by individual channel data rate scaling from 10 Gbps, to 40 Gbps, to currently developing 100 Gbps, to future projected 1000 Gbps channels. The capacity growth is also reflected by increasing total channel counts carried within an optical fiber. The capacity growth may be addressed by several means, including expanding optical amplifier bandwidth, increasing modulation constellation to transmit multiple bits per symbol, and decreasing frequency spacing between information carrying channels.

The present disclosure focuses, in part, on an optical transceiver implementation with a tight channel spacing and multiple bit per symbol modulation constellation, such as M-Quadrature Amplitude Modulation (M-QAM).

Tight channel spacing improves spectral efficiency. One attractive approach for increasing spectral efficiency is to use a set of electronic subcarriers, each modulated by data of an identical rate and locked precisely to that data rate. This approach is widely used in communications, and is generally known as Orthogonal Frequency Division Multiplexing (OFDM) in wireless applications and Discrete Multi-Tone (DMT) in Digital Subscriber Line (DSL) applications. Such electrical multiplexing and filtering provides large spectral efficiency improvements over conventional optical filtering approaches.

Increasing constellation size, M, increases information transmission capacity, while keeping signal bandwidth the same. Unfortunately, this comes at a very substantial penalty of increased noise susceptibility, and, correspondingly, reduced optical unregenerated reach. As an approximation, the reach reduction is ~50% in reach for each additional 1 bit of capacity per Hz, i.e. reach reduction occurs much faster than capacity increase. A change from Quadrature Phase Shift Keying (QPSK) to 16-QAM results in an ~7 dB penalty, and, if a 100 Gbps QPSK signal propagates 3000 km, then a 200 Gbps 16-QAM signal will propagate ~600 km.

A further issue with current state of the art implementations is the high power consumption associated with the digital signal processing (DSP) algorithms that are used to modulate/demodulate the signals, and to compensate for a variety of communication channel impairments. What is currently needed in the art is an approach that substantially simplifies these digital signal processing algorithms and provides a wide range of benefits. Specifically, an optical transceiver implementation, among other things: (1) should be scalable to optical transceiver (XCVR) designs carrying 1 Tbps and above, within a single circuit pack; (2) should partition capacity into low baud rate flows to simplify channel impairment compensation algorithms, thereby reducing circuit size and power consumption; (3) should be implementable in a highly integrated, preferably complementary metal oxide semiconductor (CMOS) or bipolar complementary metal oxide semiconductor (BiCMOS), platform, that minimizes size, power consumption, and cost; (4) should allow spectral utilization efficiency to approach signal baud rate limits; (5) should allow the use of optical and electronic components, bandwidth limited to a fraction of the desired total capacity (i.e. ~40 GHz in today's state of the art); (6) should provide sufficient tolerance to chromatic dispersion (CD), polarization mode dispersion (PMD), and amplified spontaneous emission (ASE) noise to cover practical networks; (7) should be scalable to higher order modulation constellations, as desired; and (8) should use a combination of analog and digital signal processing to minimize optical and electronic complexity and power consumption.

Previous attempts to satisfy some of the above requirements for fiber optic communication networks provide several benefits and numerous drawbacks.

The coherent Wavelength Division Multiplexing (WDM) approach uses on-off keyed modulation and puts subcarriers onto a grid precisely locked to the data rate. The receiver uses optical filtering to select individual subcarriers and subsequent direct detection for conversion to the electrical domain. The drawbacks are substantial and include: low CD and PMD tolerance, an inability to scale to phase based or multi-bit/level symbol modulation formats, and poor ASE noise tolerance.

The coherent optical OFDM approach is essentially a direct application of wireless OFDM principles to the optical domain. "Virtual" subcarriers with superimposed data modulation are generated in digital electronics via an inverse Fast Fourier Transform (FFT) operation on the transmit side. Original data is recovered via a complementary digital FFT operation on the receive side. Disadvantages include the requirement for sophisticated DSP at the transmitter and receiver operating on the complete channel data, and a requirement for adding redundant cyclic prefix data. A requirement for optoelectronic component bandwidth to cover a complete channel is detrimental. Further, subcarriers within the OFDM channel are sufficiently low frequency such that complex phase recovery techniques are required.

The sub-band multiplexed coherent optical OFDM approach extends the above concept by stacking several OFDM channels very close together to form a quasi-continuous spectrum. Disadvantages are similar to coherent optical OFDM, dominated by signal processing complexity. It is unlikely that such an approach is practical and realizable considering the associated electro-optic power consumption. Further, sharp roll-off optical filters may be required in some implementations for sub-band separation.

Binary Phase Shift Keyed (BPSK) channels optically combined have been shown to be a possibility with a direct detection receiver and coherent detection. Disadvantages stem from the fact that proper operation still requires optoelectronic bandwidth on the order of the total spectrum encompassing the complete channel, which is substantially beyond the state of the art, assuming a 1000 Gbps channel. Some use lower bandwidth components, and, correspondingly, show a very substantial and detrimental performance penalty of several dB.

Single carrier M-QAM (BPSK, QPSK, 16-QAM, etc. . . . ) modulated channels may be positioned close together, while still providing spectrally separable content. Alternately, channels may be orthogonalized with spectral overlap. A coherent receiver may convert the received signals from analog to digital with a multi-GHz bandwidth ADC and then apply DSP for channel filtering, channel distortion compensation, and data decisions. Non-orthogonal channel spacing still wastes a significant fraction of the overall spectrum. The receiver for both approaches relies on DSP, which results in large chips with high power consumption, thereby substantially limiting the level of system integration that may be achieved.

A common theme to the problems outlined above is the high complexity of the electronic processing associated with providing the required detection and demodulation functions. The processing blocks rely on an Analog-Digital Converter (ADC) front end, with a high complexity CMOS based DSP back end. Digital approaches are considered de facto standards, with well established historical benefits, including: (1) good design and simulation tools; (2) well understood algorithms with deterministic results; (3) no noise accumulation in the logic, assuming sufficient digital resolution; (4) leverage of CMOS node reduction benefits of increasing transistor count, reduced power consumption, and increased operation speed; and (5) widely taught in schools due to the focus on inexpensive simulation tools. However, there are also significant problems with the DSP based approaches. CMOS scaling problems that industry is currently encountering may be enumerated as follows: (1) scaling CMOS node geometry down does not appreciably help ADC power consumption and complexity, as one scales into deep submicron, and power is roughly fixed on a per Gsample per sec metric; (2) mask fabrication and circuit design tool costs are approximately doubling with every node generation; (3) cost per circuit function is staying roughly flat, i.e. cost per processed bit is ~flat; (4) data rate increases are forced to ride the bleeding edge of CMOS processes; and (5) there is an energy per bit bottleneck, due to supply voltage Vdd saturation in deep submicron CMOS.

A comparative example of digital vs. analog signal processing power consumption is as follows. A 13-tap time domain Finite Impulse Response (FIR) filter operating at 30 Gbaud consumes ~2 W in a DSP implementation with a 45 nm CMOS (not counting ADC overhead), i.e ~150 mW/tap. A 3-tap time domain FIR filter operating at 40 Gbps consumes ~70 mW in an analog implementation with 180 nm CMOS, i.e. ~20 mW/tap. Analog is 7.5× less power hungry than digital, while using extremely cheap CMOS geometry.

BRIEF SUMMARY OF THE DISCLOSURE

In various exemplary embodiments, the present disclosure provides an optical transceiver implementation that substantially simplifies the above DSP algorithms and, among other things: (1) may be scalable to XCVR designs carrying 1 Tbps and above, within a single circuit pack; (2) may partition capacity into low baud rate flows to simplify channel impairment compensation algorithms, thereby reducing circuit size and power consumption; (3) may be implementable in a highly integrated, preferably CMOS or BiCMOS, platform, that minimizes size, power consumption, and cost; (4) may allow spectral utilization efficiency to approach signal baud rate limits; (5) may allow the use of optical and electronic components, bandwidth limited to a fraction of the desired total capacity (i.e. ~40 GHz in today's state of the art); (6) may provide sufficient tolerance to CD, PMD, and ASE noise to cover practical networks; (7) may be scalable to higher order modulation constellations, as desired; and (8) may use pilot tones and a combination of analog and digital signal processing to minimize optical and electronic complexity and power consumption.

In one exemplary embodiment, the present disclosure provides a polarization multiplexed optical system, including: a transmitter configured to transmit a polarization multiplexed signal and to insert a pilot tone as a state of polarization reference for the polarization multiplexed signal; and a receiver communicatively coupled to the transmitter and configured to extract the pilot tone and correspondingly polarization demultiplex the polarization multiplexed signal based on the extracted pilot tone.

In another exemplary embodiment, the present disclosure provides a polarization multiplexed optical method, including: inserting a pilot tone as a state of polarization reference for a polarization multiplexed signal; transmitting the polarization multiplexed signal with the pilot tone; receiving the polarization multiplexed signal with the pilot tone; and demultiplexing the polarization multiplexed signal using the pilot tone.

In a further exemplary embodiment, the present disclosure provides a polarization multiplexed transceiver, including: a transmitter; a receiver; circuitry within the transmitter configured to insert a pilot tone as a state of polarization reference for a polarization multiplexed signal; and circuitry within the receiver configured to demultiplex the polarization multiplexed signal using the pilot tone.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Figure 1:
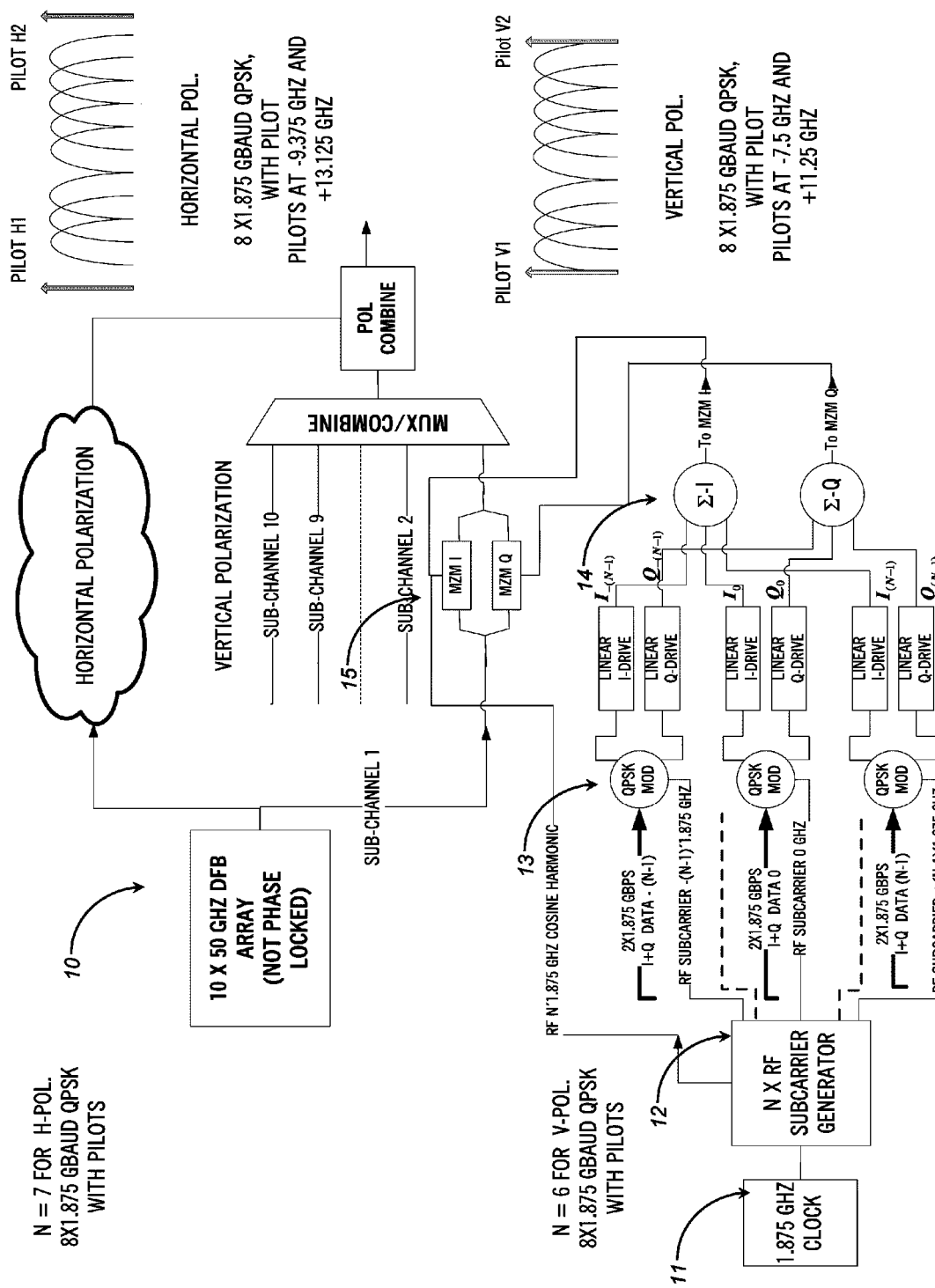
FIG. 1 is a schematic diagram illustrating one exemplary embodiment of the Self Demultiplexed Detection (SDD) transmitter of the present disclosure, utilizing 10 Polarization Multiplexed (PM) QPSK OFDM channels, each including 8×1.875 Gbaud QPSK-modulated subcarriers, with a total capacity of 600 Gb/s—radio frequency (RF) carrier signals are at exact multiples of data baud, and all data baud streams are synchronized and locked—the OFDM-type spectrum is assembled using data frequency up-conversion.

In various exemplary embodiments, the present disclosure provides an optical transceiver implementation that inherently simplifies the electronic signal processing design. This provides simplicity, an ability to use lower cost 65 nm CMOS geometries (i.e instead of 32 nm CMOS geometries, for example) or 130 nm BiCMOS geometries, for example, lowers overall power consumption, and provides a path to higher levels of power limited system density.

The individual building blocks used in the present disclosure, such as OFDM, pilot tones, etc., are generally known to those of ordinary skill in the art, in the broadest conceptual sense, however the present disclosure provides a unique feed forward algorithm for processing of the received signal, a unique combination of features and functionalities, and simplifications in the resulting signal processing algorithms that allow the introduction of analog signal processing in the high rate data path, while using digital algorithmic computations for handling slow rate calibrations and adaptation of coefficients. The specifics of these features and functionalities are described in greater detail herein below.

In various exemplary embodiments, the present disclosure enables the SDD of PM signals, which provides for the automatic Polarization Demultiplexing of PM channels transmitted through an optical fiber with polarization axes arbitrarily distributed over distance and arbitrarily evolving over time. The SDD is achieved by a simple analog processing of pilot tone signals involving only a few multiplication and addition operations.

In various exemplary embodiments, the present disclosure also provides a high data rate optical transmitter and receiver, with the following universe of potential features: (1) data subcarriers targeting baud rate as an intersection between the highest rate supported by analog application specific integrated circuit (ASIC) circuitry, and the lowest rate required to minimize chromatic dispersion CD and PMD processing (with today's BiCMOS technology, this is ~4 Gbaud); (2) each data subcarrier is modulated with QAM-type signals, and preferentially offset QAM to minimize inter-symbol and inter-carrier interference; (3) several data subcarriers are orthogonally frequency division multiplexed to fill a channel bandwidth defined by transmitter and receiver component bandwidths (drivers, optical modulators, photodetectors, etc. . . . ) (with today's bandwidth of ~20 GHz, this is ~9 subcarriers at 4 Gbaud, note: subsequent analysis is shown at sub-optimal 1.875 Gbaud, but the principles remain the same); (4) optical polarization multiplexing of composite OFDM signals to double channel spectral efficiency; (5) an addition of pilot tones on both sides of the signal spectrum; (a) pilot tones at different frequencies for the Horizontal and Vertical polarizations to allow electrical separation; (b) pilot tones substantially simplifying carrier phase recovery at the receiver, and allowing use of cheaper, higher line width optical sources, and scaling to higher QAM constellations; (c) 2 pilot tones allowing simple interpolations of the required phases for individual data subcarriers; (d) pilot tones allowing the simple feed-forward, single computation recovery of polarizations; (e) pilot tones allowing polarization recovery after an abrupt polarization change, as after a protection switch, with several nanosecond time constant; (f) pilot tones allowing simple feed-forward compensation of polarization dependent loss; (6) combining several polarization-multiplexed OFDM signals using wavelength domain multiplexing, where these channels do not have to be orthogonalized, but may be if somewhat higher spectral efficiency is desired, and where the number of combined wave channels is limited by the total thermal and real estate limits imposed by the integrated electronic and optical integrated circuits (ICs) (with current technology, this limit is around 1 Tbps of aggregate throughput); (7) data path processing is done predominantly in the analog domain to minimize circuit power consumption and real estate; (8) analog processing circuitry provides low frequency signals outside of the data path, which are digitized and processed in low speed, low power digital blocks to determine circuit calibration and channel impairment processing coefficients; and (9) digital processing of the local oscillator signals is used to optimize filter bandwidth to fit particular impairments observed by the optical channels, i.e. in an ASE limited or nonlinear phase noise limited range.

FIG. 1 is a schematic diagram illustrating one exemplary embodiment of the SDD transmitter 10 of the present disclosure, utilizing 10 PM QPSK OFDM channels, each comprising 8×1.875 Gbaud QPSK modulated subcarriers, with a total capacity of 600 Gb/s. RF carrier signals are at exact multiples of data baud, and all data baud is synchronized and locked. The OFDM type spectrum is assembled using data frequency up-conversion.

An important physical concept is the SDD for PM signals. In conventional PM optical fiber communication systems, polarization demultiplexing is a challenging task because the state of polarization (SOP) at the receiver differs from the SOP at the transmitter, in which horizontally and vertically polarized channels are combined together, due to random rotation of the optical fiber polarization axes varying over time. When a conventional coherent detection scheme without SDD, in which a local oscillator (LO) is simply mixed with a signal at a receiver, is used, the output is always a mixture of both polarization channels. Therefore, real time polarization tracking is required to demultiplex the PM channels. This real time polarization tracking is the equivalent of multiplying the Jones vector of the light field at the output of the optical fiber by the inverse Jones matrix of the optical fiber, which varies randomly over time. In SDD, we have orthogonal pilot tones (each at the SOP identical to the respective polarization channel) set at a transmitter at different carrier frequencies by using an appropriate modulation technique described below. When the pilot tones' frequencies are close to the data-carrying subcarrier frequencies, the optical fiber Jones matrix for each of the subcarriers is approximately the same as the Jones matrix of the appropriate pilot tone. Consequently, once the pilot signals are extracted at the receiver, their Jones matrices may be easily restored and used for polarization demultiplexing of the subcarriers.

Figure 2:
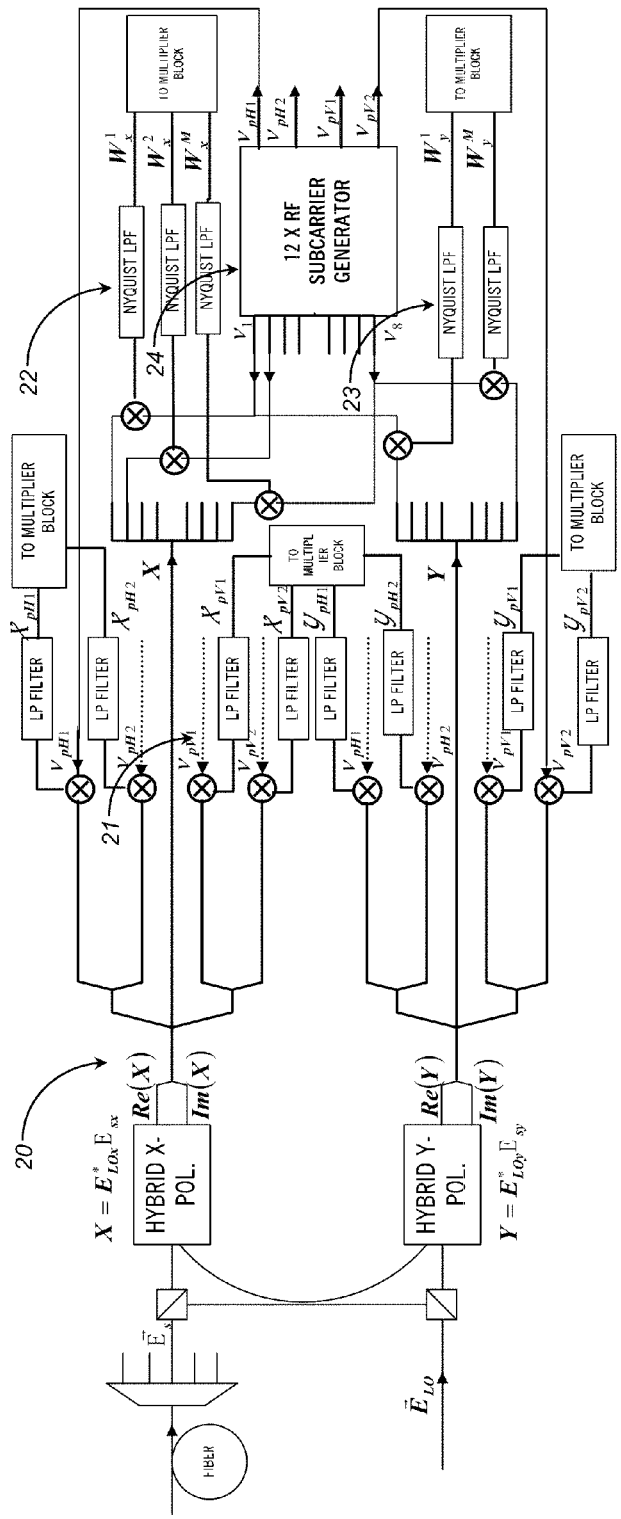
FIG. 2 is a schematic diagram illustrating one exemplary embodiment of the SDD PM OFDM QPSK receiver of the present disclosure.
Figure 3:
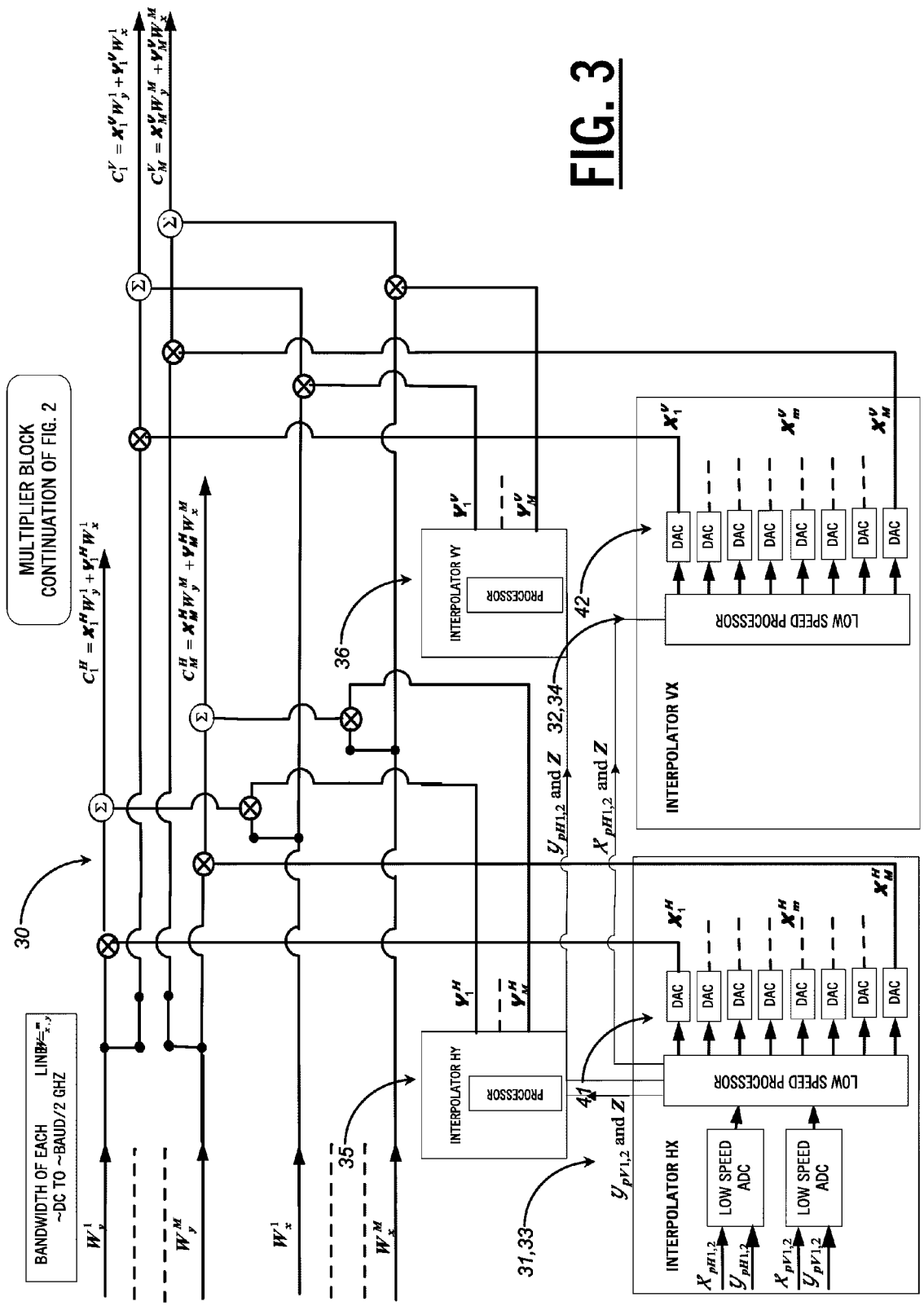
FIG. 3 is a schematic diagram illustrating one exemplary embodiment of a Multiplier Block, with a low speed, digital interpolator block, used with the SDD PM OFDM QPSK receiver of the present disclosure.

At the SDD receiver 20, illustrated in FIGS. 2 and 3, detection of the PM signal is done in three steps. First, the optical LO is mixed with the PM signal using a conventional optical hybrid, as in a conventional coherent detection scheme, generating an RF signal. Second, the content of the X and Y components of each vertically polarized and horizontally polarized pilot tone is extracted, with X and Y being the polarization axes of the polarization beam splitter at the receiver 20. This is done by mixing the RF signal from the hybrid with a RF local oscillator. For each pilot, the frequency of the RF LO is chosen such that the mixing product converts the RF signal to the base band. By applying low pass filtering 21, the contents of the X and Y components of each H-pol. and V-pol. pilot are separately extracted. As the H-pol. and V-pol. pilots are set at different frequencies, their separation is performed by selective filtering, which comprises mixing with an appropriate RF LO and low pass filtering. Next, the X and Y components of each H-pol. and V-pol. pilot, each being low speed signals with a bandwidth of <1 GHz, are processed in an interpolator low speed DSP block 31 and 32. The DSP operation is governed by a simple algorithm to produce a virtual digital pilot tone signal per each subcarrier. Each virtual digital pilot tone signal is then converted to an analog signal by using a low-speed digital-to-analog converter (DAC) 41 and 42 and sent to a multiplier for final downconversion and demultplexing of the RF data subcarrier.

In parallel, the contents of the X and Y components of each of the RF data subcarriers is separately extracted. This is done in a similar manner by mixing the RF signal from the hybrid with a RF local oscillator, whose frequency is chosen such that the mixing product for each of the subcarriers ends up in the baseband. Applying a Nyquist filtering 22 and 23 after that allows us to frequency demultiplex the subcarrier channels with minimum Inter-Channel Interference (ICI) and Inter-Symbol Interference (ISI). Note that, at this point, the subcarrier channels are only frequency demultiplexed, but they still represent a mixture of the horizontally and vertically polarized channels and need to be polarization demultiplexed. Third, both X and Y components of each subcarrier channel signal are mixed with its virtual analog pilot signal, coming from the interpolator block 31 and 32, and the mixing products are summed up to produce an automatic polarization demultiplexing of H and V polarized channels for each of the subcarriers. In addition to the automatic polarization demultiplexing, the SDD based on the frequency separated pilot tones also enables automatic phase and frequency tracking, because the horizontal and vertical vector RF LO's turn out to be in phase with the RF signals in their respective polarization. The phase difference between the vector RF LO's and vector RF signals cancels out, because, for each polarization, both the RF LO and the RF signal have the same optical LO contents.

Another advantage of the pilot tones SDD technique is a better tolerance to the nonlinear penalties as compared to a conventional coherent detection technique. As the pilot tone experiences approximately the same cross phase modulation (XPM) as the signal does, the phase noise associated with the XPM is reduced when the pilot tone beats with the signal. As a result, the nonlinear signal distortion becomes partially compensated.

Figure 4:
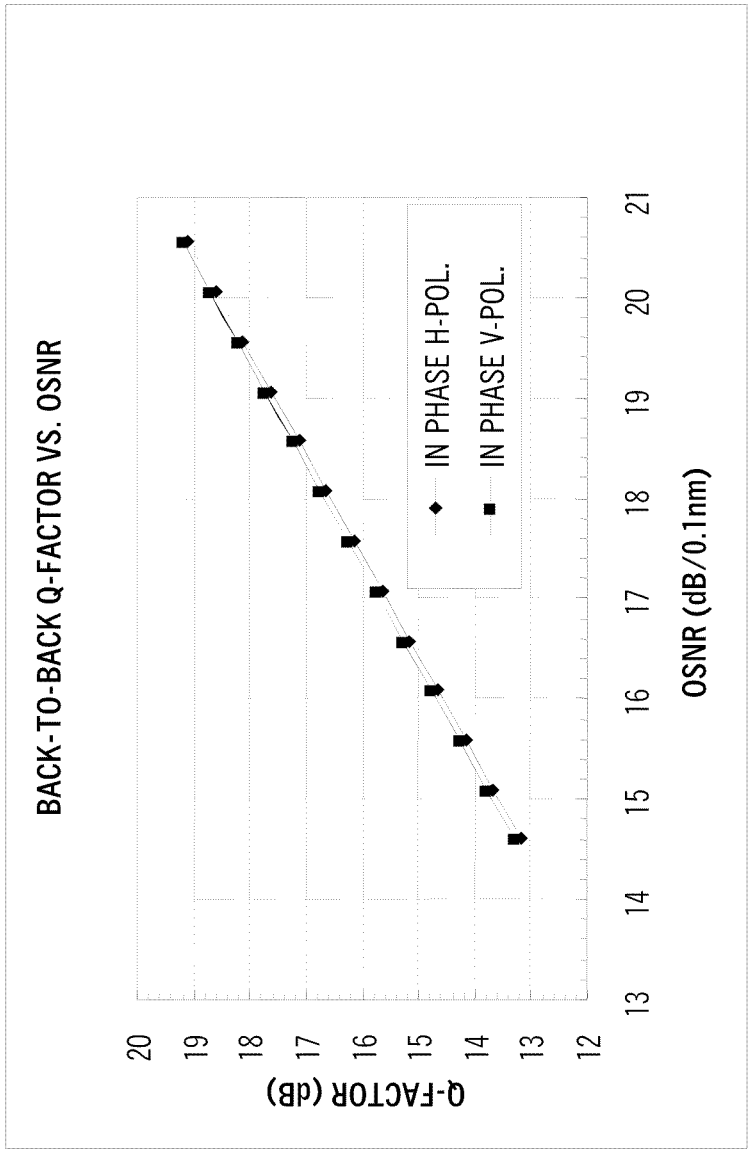
FIG. 4 is a plot of back-to-back Q-factor versus Optical Signal-to-Noise Ratio (OSNR) for the 8×1.875 GBaud OFDM QPSK with SDD scheme.
Figure 5:
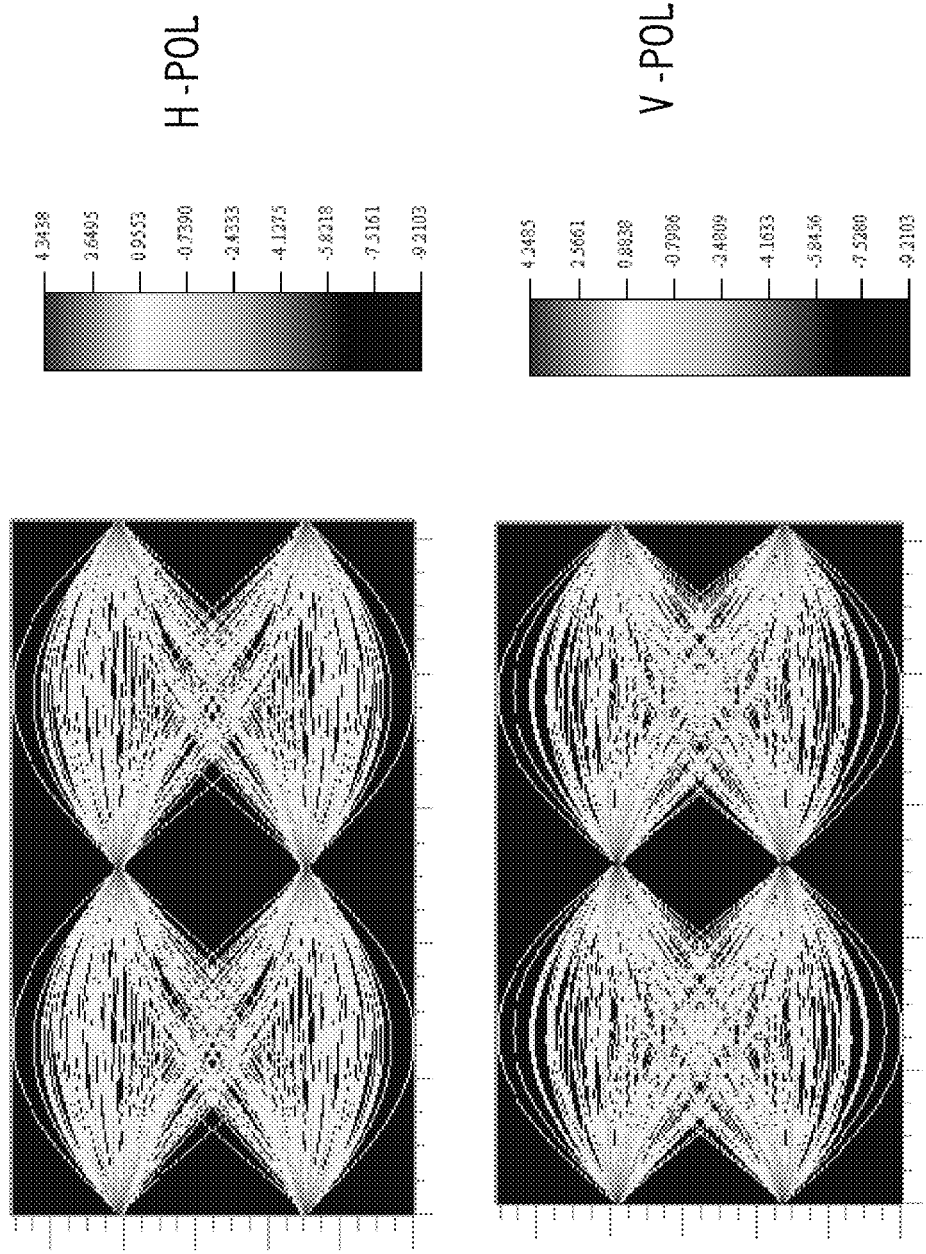
FIG. 5 is a back-to-back eye diagram for H-pol. and V-pol. for the 8×1.875 GBaud OFDM QPSK with SDD scheme.

FIGS. 4 and 5 illustrate back-to-back Q-factor versus OSNR and the eye diagram for a test channel placed in the middle of 21 WDM channels with 50 GHz channel spacing and 8×1.875 Gbps OFDM QPSK in each channel using the SDD scheme. The Q-factor performance in FIG. 4 is close to that in an ideal case of a conventional homodyne detection scheme, accounting for extra optical power in the pilot tones.

Figure 6:
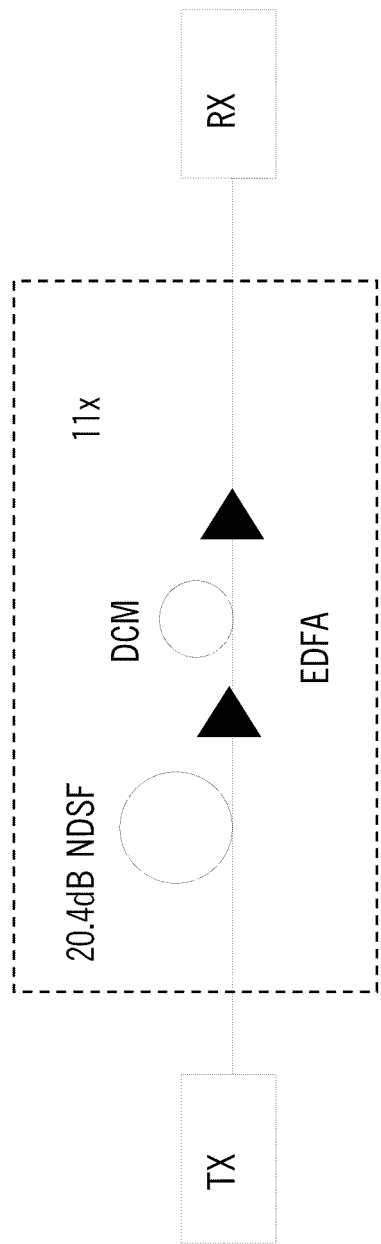
FIG. 6 is a schematic diagram illustrating an optical fiber link used in a simulation in accordance with the systems and methods of the present disclosure.

The system performance and impact of the nonlinear penalties was also simulated by transmitting 21 WDM channels with 50 GHz channel spacing and 8×1.875 GBaud OFDM QPSK in each channel though 11 spans of NDSF optical fiber and detecting the signal using the SDD scheme. The optical fiber system had the following parameters: span loss: 20.4 dB; NDSF dispersion coefficient: 17.3 ps/nm-km @ 1550 nm; Type0 Dispersion Compensation Module (DCM) dispersion coefficient: −102 ps/nm-km @ 1550 nm; erbium doped fiber amplifier (EDFA) noise figure: 6.5 dB; 21 channels with 50 GHz spacing; system PDL: 6 dB; and model type: split-step FFT Monte Carlo. The optical fiber link scheme is illustrated in FIG. 6.

Figure 7:
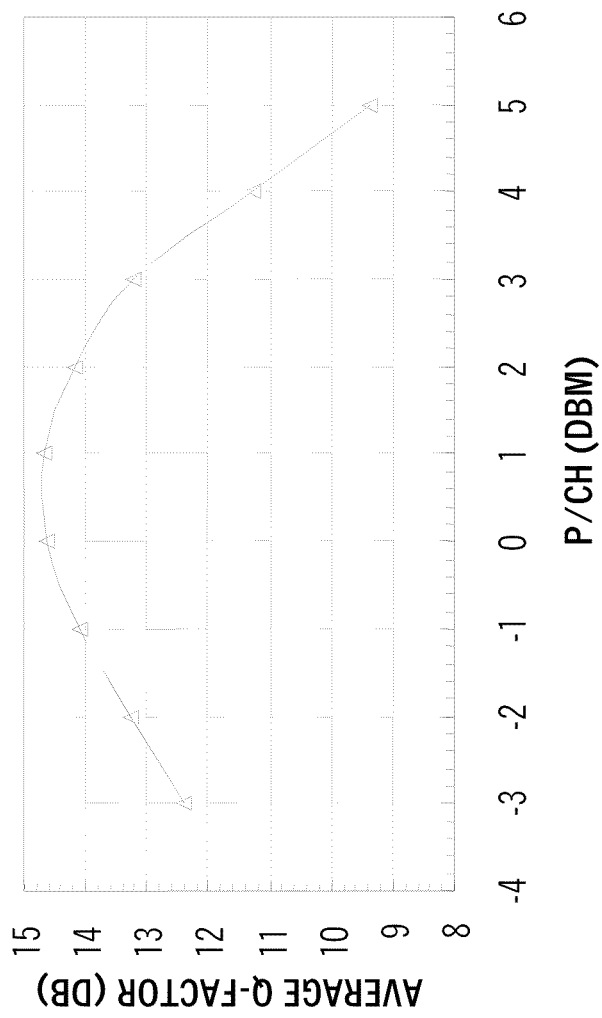
FIG. 7 is a plot of Q-factor versus channel power for a test channel placed in the middle of 21 8×1.875 GBaud OFDM QPSK channels with 50 GHz channel spacing in an 11×20 dB Non-Dispersion Shifted Fiber (NDSF) system.

FIG. 7 is a plot of Q-factor versus channel power for a test channel placed in the middle of the 21 8×1.875 GBaud OFDM QPSK channels with 50 GHz channel spacing in an 11×20 dB NDSF system. Apt is a pilot tone amplitude relative to the amplitude of the in-phase component of a subcarrier QPSK signal. FIG. 7 demonstrates a robust performance over about 900 km distances with at least 3 dB safety margins above the forward error correction (FEC) threshold.

Again, FIG. 1 is a schematic diagram of a SDD transmitter 10, with an exemplary embodiment using 10 PM QPSK OFDM channels, each comprising 8×1.875 Gbaud QPSK modulated subcarriers, with a total capacity of 600 Gb/s. In this exemplary embodiment, the baud rate of 1.875 Gbaud (with 8 subcarriers and 10 channels) was chosen to achieve a target capacity of 600 Gb/s. Scaling up this capacity to 1 Tb/s may be achieved using, for example, a 4 Gbaud rate with 8 subcarriers and 9 channels or with 9 subcarriers and 8 channels. Hence, the 1 Tb/s system, in terms of the subcarriers and channel counts, is close to the exemplary 600 Gb/s system, except that the baud rate is increased by a factor of about 2.1. Consequently, the complexity of both optical and electrical parts of the transceiver remains about the same when it scales from the exemplary 600 Gb/s system (8×1.875 Gbaud 10 channel QPSK) to the 1 Tb/s system (9×4 Gbaud 8 channel QPSK), while the transceiver operation principle remains identical. A 1.875 GHz RF clock 11 is fed to an N×RF subcarrier generator 12 which produces a N×1.875 GHz tones RF comb. These tones are then fed to QPSK data modulators 13 to generate 2×(N−1) RF subcarrier channels at frequencies of multiples of 1.875 GHz ranging from −(N−1)×1.875 GHz to +(N−1)×1.875 GHz. At the output of each n-th QPSK modulator, where n is running from −(N−1) to +(N−1), the linear in-phase drive voltage, $I_n$, and linear quadrature drive voltage, $Q_n$, are created. Each n-th QPSK modulator is driven by an in-phase 1.875 Gbps data signal, $E^I_n$, and a quadrature 1.875 Gbps data signal, $E^Q_n$, such that:

$$I_n = \begin{cases} E^I_n \cos(n\Omega t) - E^Q_n \sin(n\Omega t), & n > 0 \\ E^I_n \cos(|n|\Omega t) + E^Q_n \sin(|n|\Omega t), & n < 0 \\ E^I_0, & n = 0, \end{cases} \quad (1a)$$

and $$Q_n = \begin{cases} E^I_n \sin(n\Omega t) + E^Q_n \cos(n\Omega t), & n > 0 \\ E^Q_n \cos(|n|\Omega t) - E^I_n \sin(|n|\Omega t), & n < 0 \\ E^Q_0, & n = 0, \end{cases} \quad (1b)$$

where $\Omega = 2\pi \times 1.875$ GHz. One can see from equations (1) that the in-phase and quadrature drive voltages, $I_n$ and $Q_n$, are such that $I_n + iQ_n = e^{in\Omega t}(E^I_n + iE^Q_n)$ represents the data signal at n-th double sideband subcarrier frequency with $E^I_n$ and $E^Q_n$ being the in-phase and quadrature data components at the n-th subcarrier. The outputs, $I_n$ and $Q_n$, from the RF QPSK modulators are combined in the in-phase, Σ-I and Σ-Q, summers 14 and fed to in-phase MZM I and quadrature MZM Q of the combined optical Mach Zehnder modulator 15, respectively. The output of the optical Mach Zehnder modulator produces an optical field, $$E^V_{s0} = \sum_n e^{i(\omega_1 + n\Omega)t}(E^I_n + iE^Q_n),$$

for the 1st vertically polarized channel centered at optical frequency, $\omega_1$. Signal modulation in the rest of the vertically polarized channels, from channel 2 to 10, is performed in a similar manner. Note that, in the exemplary embodiment illustrated in FIG. 1, N=6 for the vertically polarized channels. In addition to that, there is a gap in place of the n=−1 subcarrier. This gap is created to place a LO in the gap at the receiver and minimize the interference of the data signal in the vicinity of the LO with the LO pilot tones beating signals. The gap at the n=−1 subcarrier is made simply by eliminating the RF subcarrier −1×1.875 GHz path in FIG. 1. The horizontally polarized optical signals in FIG. 1 are generated in the same manner as the vertically polarized signals, with only one exception. The left-hand side pilot H1 and right-hand side pilot H2 are moved farther away from the central subcarrier symmetrically by one 1.875 GHz spacing relative to their counterpart vertically polarized pilot tones. This is realized by using a RF subcarrier generator with N=6 and eliminating the RF subcarrier ±5×1.875 GHz paths.

Figure 8:
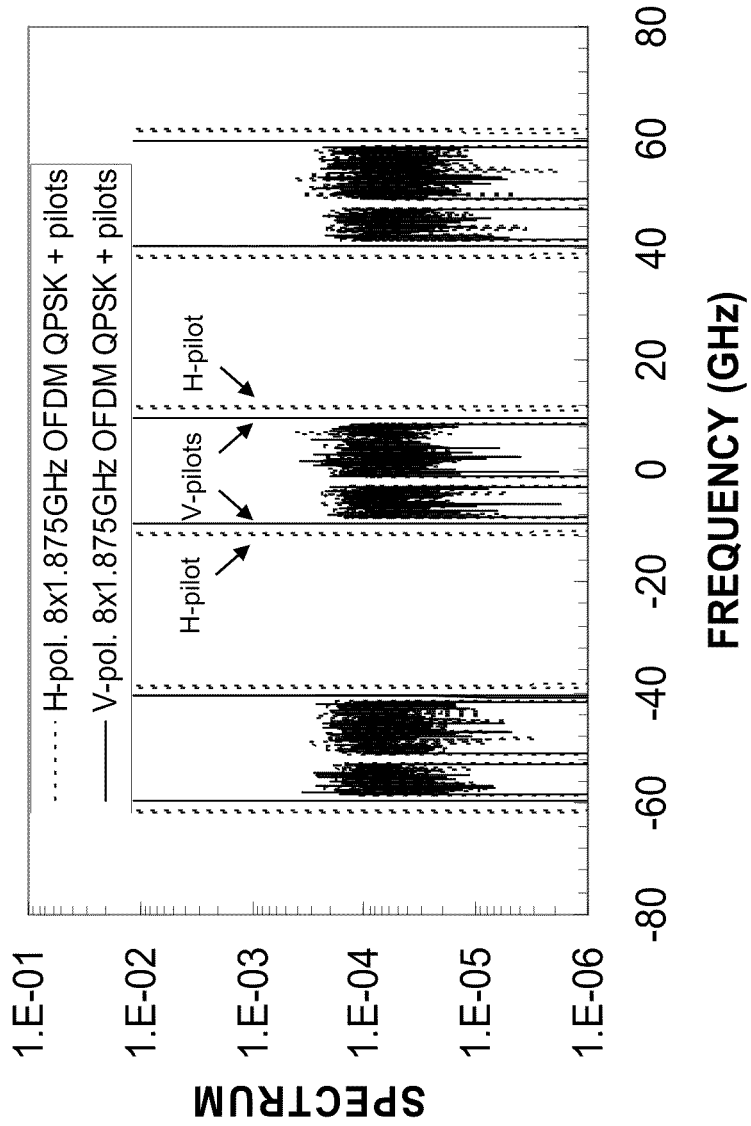
FIG. 8 is a plot illustrating a modeled spectrum of horizontally polarized and vertically polarized 8×1.875 Gbaud OFDM QPSK channels with their respective pilot tones.

FIG. 8 illustrates a modeled optical spectrum at the output of the of SDD QPSK transmitter for horizontally and vertically polarized 8×1.875 GHz OFDM QPSK channels with their respective pilot tones. Only three channels with 50 GHz channel spacing are shown in FIG. 8 to highlight the internal spectral structure within each 8×1.875 GHz OFDM QPSK channels.

Again, FIG. 2 is a schematic diagram of the SDD PM QPSK receiver 20 with an exemplary embodiment of M=8 OFDM QPSK 1.875 Gbaud subcarriers per a wavelength channel. The PM OFDM QPSK signals are transmitted through a communication fiber and received by a coherent SDD PM OFDM QPSK receiver 20. The first part of the coherent SDD receiver 20 shown in FIG. 2 (from the optical input to the output of the X and Y hybrids) represents a conventional coherent PM QPSK receiver, yielding complex RF signals, $X=E^*_{LOx}E_{sx}$ and $Y=E^*_{LOy}E_{sy}$, in X and Y polarization relative to the X and Y axes of the polarization beam splitters used in the SDD receiver 20. Here, $E_{LOx,y}$ and $E_{sx,y}$, are the X and Y polarization components of the optical LO and the incoming optical signal fields, respectively. Next, each of the X and Y signals is split in three parts. In the first and the third ones, each of the X and Y signals is mixed with complex RF tones at the double-sideband frequencies, $v_{pH1,2}$ and $v_{pV1,2}$, respectively, corresponding to the frequencies of the pilot tones in the H and V polarizations. The RF tones at the frequencies, $v_{pH1,2}$ and $v_{pV1,2}$, are generated by the 6×RF subcarrier generator 24 similar to the one used in the transmitter 10 of FIG. 1. In the M=8 OFDM QPSK embodiment shown in FIG. 2, $v_{pH1}$=−9.375 GHz, $v_{pH2}$=+13.125 GHz and $v_{pV1}$=−7.5 GHz, $v_{pV2}$=+11.25 GHz. Such frequency mixing converts the RF content of each of four pilot tones to the base band. Filtering these contents with a low pass filter allows one to separately detect the RF contents of each of four pilot tones. In the second part of the X and Y signals, each X and Y is split into 8 parts and each m-th of which is mixed in a complex multiplier-type down-converter with a complex RF tone at the double-sideband frequency:

$$v_m = \begin{cases} (m-5) \times 1.875 \text{ GHz}, & m \geq 5 \\ (m-6) \times 1.875 \text{ GHz}, & m \leq 4, \end{cases} \quad (2)$$

where m=1÷8. This kind of mixing allows one to down-convert the m-th subcarrier to the base band. A matched analog Nyquist filter is then used to separate the contents in each of the OFDM subcarriers from the neighbor subcarriers with minimum ISI. In the next step, both the separated subcarriers, $W_{x,y}^m$, along with the pilot tone signals, $\mathcal{X}_{pH1,2}$, $\mathcal{X}_{pV1,2}$ and $\mathcal{Y}_{pH1,2}$, $\mathcal{Y}_{pV1,2}$, are sent to the Multiplier Block 30 shown in FIG. 3, which is a continuation of FIG. 2.

In the Multiplier Block 30, the pilot tone signals, $\mathcal{X}_{pH1,2}$, $\mathcal{X}_{pV1,2}$ and $\mathcal{Y}_{pH1,2}$, $\mathcal{Y}_{pV1,2}$, are processed in four Interpolator blocks, Interpolator Hx 33, Interpolator Vx 34, Interpolator Hy 35, and Interpolator Vy 36. Although, for the purpose of clarity, the Interpolator blocks 33, 34, 35, and 36 are shown in the FIG. 3 as being setup separately, in a real implementation, all four Interpolator blocks 33, 34, 35, and 36 may be combined into one Interpolator block. The purpose of using the Interpolator block(s) 33, 34, 35, and 36 is threefold. It provides equalization of CD, PMD, and PDLs. The Interpolator block(s) 33, 34, 35, and 36 are DSP blocks. However, unlike the high speed DSP used in conventional coherent systems, where the ADC operates at about double baud rate speeds, the DSP used in the present disclosure is a low speed DSP operating at <1 GHz speed, for example. The upper limit of the DSP speed is determined by the larger of three factors, frequency offset between transmitter and LO lasers, linewidth of the pilot tones, and variation speed of fiber polarization axes, as well as sudden changes of PMD. Typical laser offsets may be controllably kept to below about 50 MHz. As the pilot tones co-propagate in the optical fiber with the subcarriers in the same channel and neighboring channels, their linewidth increases from the source laser linewidth by the amount of the XPM due to the neighbors resulting in the pilot tones 3 dB linewidth enhancement from less than 10 MHz to typically less than 100 MHz. For an overwhelming majority of fiber optic communication networks, the speed of PMD variation is well below 100 MHz even when a dispersion compensation fiber (DCF) spool is directly impacted by a shock wave, so that the DSP speed limit is determined by the pilot tones linewidth. Note that the use of a low speed DSP allows one to dramatically reduce the power consumed by the DSP circuits relative to that required for a coherent receiver DSP operating at or above the signal baud rate.

Starting with a polarization multiplexed OFDM signal with M=8 subcarriers generated by the transmitter 10 shown in FIG. 1.

$$\vec{E}_{s0} = \begin{pmatrix} E_{s0}^H \\ E_{s0}^V e^{i\delta} \end{pmatrix} e^{i\rho}, \quad (3)$$

where δ is the relative phase offset between the carriers in the horizontal and vertical polarization channels at the fiber input caused by different light paths from the source laser to the polarization beam combiner, and ρ is the phase of the central subcarrier frequency component at the fiber input. The spectra of the $E_{s0}^H$ and $E_{s0}^V$ channels are shown schematically in the upper and lower insets of FIG. 1 and modeled in FIG. 8.

The signal $\vec{E}_{s0}$ contains the pilot tones $\vec{E}_{pH}$ and $\vec{E}_{pV}$ which are set at a lower edge frequency $\omega_{pH1}$ and higher edge frequency $\omega_{pH2}$ for the H polarization channel and a lower edge frequency $\omega_{pV1}$ and higher edge frequency $\omega_{pV2}$ for the V polarization channel, respectively, $$\vec{E}_{pH} = \sqrt{P_c}\begin{pmatrix}1\\0\end{pmatrix}(e^{i\omega_{pH1}t} + e^{i\omega_{pH2}t}), \quad (4)$$

$$\vec{E}_{pV} = \sqrt{P_c}\begin{pmatrix}1\\0\end{pmatrix}(e^{i\omega_{pV1}t} + e^{i\omega_{pV2}t}),$$

where $P_c$ is the power of each pilot tone in each polarization channel. The signal $\vec{E}_{s0}$ is transmitted through a fiber with the Jones matrix $$\hat{J}(\omega) = e^{\frac{i}{2}\psi_0(\omega)}\hat{M}(\omega),$$

where $\psi_0(\omega)=-(\omega-\omega_0)^2 D_{ac}$ is the phase shift due to the CD, $$D_{ac} = \int_0^L \beta'' dz$$

is the cumulative dispersion, $\beta''$ is the $2^{nd}$ order dispersion coefficient at $\omega$, and $\omega_0$ is a center light frequency of the channel. In the most general representation of an optical fiber with arbitrary PMD and PDL, the matrix is:

$$\hat{M} = \hat{F}\begin{pmatrix} 1 & 0 \\ 0 & r \end{pmatrix}\hat{H}^+ \tag{5}$$

$$= \begin{pmatrix} f_1(\omega) & f_2(\omega) \\ -f_2^*(\omega) & f_1^*(\omega) \end{pmatrix}\begin{pmatrix} 1 & 0 \\ 0 & r \end{pmatrix}\begin{pmatrix} h_1^*(\omega) & -h_2(\omega) \\ h_2^*(\omega) & h_1(\omega) \end{pmatrix},$$

where $\hat{F}$ and $\hat{H}$ are arbitrary unitary matrices with $|f_1|^2+|f_2|^2=|h_1|^2+|h_2|^2=1$, $r^2<1$ is a PDL coefficient.

It has been shown that, for an arbitrary fiber Jones matrix, a simple combination of multiplication and adding operation between the RF pilot tone signals, $\bar{x}_{pH1,2}$, $\bar{x}_{pV1,2}$, $\bar{y}_{pH1,2}$, $\bar{y}_{pV1,2}$, and the subcarrier signals, $W_{x,y}^m$, yields the original polarization demultiplexed signal. Such self demultiplexed combination is described by the following formula for the H-pol. channel:

$$r^2 C_m^H(t) = \boldsymbol{X}_m^H W_y^m + \boldsymbol{Y}_m^H W_x^m, \tag{6a}$$

where $C_m^H(t)=E_{Hm}^I+iE_{Hm}^Q$, $E_{Hm}^{I,Q}$ are the in-phase and quadrature components of the m-th subcarrier signal in H-pol. respectively, $$\boldsymbol{X}_m^H = -Z^* \bar{X}_{Vm}, \boldsymbol{Y}_m^H = Z^* \bar{y}_{Vm}, \tag{6b}$$

$$Z = \gamma[\bar{y}_{pV1}\bar{x}_{pH}(\omega_{pV1}) - \bar{x}_{pV1}\bar{y}_{pH}(\omega_{pV1})],$$

$$\bar{x}_{Vm} = (\alpha_{Vm}\bar{x}_{pV1} + \beta_{Vm}\bar{x}_{pV2})e^{-\frac{i}{2}\psi_0(\omega_m)},$$

$$\bar{y}_{Vm} = (\alpha_{Vm}\bar{y}_{pV1} + \beta_{Vm}\bar{y}_{pV2})e^{-\frac{i}{2}\psi_0(\omega_m)},$$

$\gamma$ is a constant completely determined by the powers of the optical ($P_{LO}$) and RF ($|G_{LO}|^2$) LOs and the power of the pilot tone $$P_c, \gamma = \frac{4}{P_{LO}^2 P_c \sqrt{P_c} |G_{LO}|^4}.$$

The self demultiplexed formula for the V-pol. channel is:

$$r^2 C_m^V(t) = \boldsymbol{X}_m^V W_y^m + \boldsymbol{Y}_m^V W_x^m, \tag{7a}$$

where $C_m^H(t)=E_{Vm}^I+iE_{Vm}^Q$, $E_{Vm}^{I,Q}$ are the in-phase and quadrature components of the m-th subcarrier signal in V-pol. respectively, $$\boldsymbol{X}_m^V = Z^*\bar{X}_{Hm}, \boldsymbol{Y}_m^H = -Z^*\bar{y}_{Hm}, \tag{7b}$$

$$\bar{X}_{Hm} = (\alpha_{Hm}\bar{X}_{pH1} + \beta_{Hm}\bar{X}_{pH2})e^{-\frac{i}{2}\psi_0(\omega_m)},$$

$$\bar{y}_{Hm} = (\alpha_{Hm}\bar{y}_{pH1} + \beta_{Hm}\bar{y}_{pH2})e^{-\frac{i}{2}\psi_0(\omega_m)}.$$

In equations (6) and (7), $\bar{X}_{pH1,2}$, $\bar{X}_{pV1,2}$, $\bar{y}_{pH1,2}$, $\bar{y}_{pV1,2}$ are the dispersion compensated pilot tone signals:

$$\bar{X}_{pH1,2} = \bar{X}_{pH1,2}\exp\{i0.5D_{ac}(6\Omega)^2\}, \bar{X}_{pV1,2} = \bar{X}_{pV1,2}\exp\{i0.5D_{ac}(5\Omega)^2\}$$

and $$\bar{y}_{pH1,2} = \bar{y}_{pH1,2}\exp\{i0.5D_{ac}(6\Omega)^2\}, \bar{y}_{pV1,2} = \bar{y}_{pV1,2}\exp\{i0.5D_{ac}(5\Omega)^2\}$$

In equations (6a) and (7a), the $\boldsymbol{X}_m^{H,V}$ and $\boldsymbol{Y}_m^{H,V}$ are the virtual pilot tone signals for m-th subcarrier created in the Interpolator, described above, from the actual pilot signals $\bar{X}_{pH1,2}$, $\bar{X}_{pV1,2}$ and $\bar{y}_{pH1,2}$, $\bar{y}_{pV1,2}$. As follows from equations (6a) and (7a), the overall impact of PDL results in a reduction of amplitude of the polarization demultiplexed H-pol. signal, $C_m^H(t)$, and V-pol. signal, $C_m^V(t)$, by the same quantity equaled to the amount of PDL $r^2$. This could have seemed counterintuitive at first glance because PDL, by itself, means a discrimination of one polarization component relative to the other one. However, in the SDD technique of the present disclosure, unlike conventional polarization tracking, one is detecting, in effect, a product of two signals, $Z^*$ and $\bar{y}_{Vm}W_x^m - \bar{X}_{Vm}W_y^m$ for H-pol. Both of these two signals turn out to be proportional to $r$ being a square root of the PDL coefficient. Hence, their product is proportional to $r^2$. For the V-pol., these two signals are $Z^*$ and $\bar{X}_{Hm}W_y^m - \bar{y}_{Hm}W_x^m$, both of which being proportional to $r$.

When PDL in an optical fiber is negligible, spectral components of the polarization channels launched in H and V polarization at each given frequency remain mutually orthogonal all the way in the optical fiber. This mutual orthogonality may be used as leverage for a somewhat simplified detection scheme. It has been shown that, for an arbitrary fiber Jones matrix with no PDL, the self demultiplexing formula for the orthogonal polarization detection (OPD) is as follows:

$$C_m^H(t)=\gamma_1(\bar{X}^*_{Hm}W_x^m + \bar{y}^*_{Hm}W_y^m), C_m^V(t)=\gamma_1(\bar{X}^*_{Vm}W_x^m + \bar{y}^*_{Vm}W_y^m), \tag{8}$$

where the constant $\gamma_1=2/(P_{LO}|G_{LO}|^2\sqrt{P_c}$. Once PDL is no longer zero, the formula in equation (8) is no longer valid and there may be significant cross-polarization penalties associated with PDL, depending on orientation of PDL axes. Note that this formula contains one less multiplication operation as compared to the SDD scheme described by equations (6) and (7). As a consequence, one may expect a somewhat smaller amount of noise associated with the multiplication operations and, hence, a somewhat better Q-factor. However, modeling shows that the Q-factor advantage of the OPD versus SDD is very limited, <0.3 dB in systems with no PDL. Besides, this advantage turns into a penalty when PDL exceeds about 0.3 dB. In addition to that, one more multiplication operation for SDD as compared to the OPD does not require any additional hardware or even any change in the receiver hardware scheme shown in FIGS. 2 and 3. The additional multiplication operation in question in the SDD scheme is a multiplication operation between low speed signals and is performed digitally in the Interpolator low speed DSP block.

In general, OPD is the easiest for pilot signal processing, but is not tolerant to PDL. SDD is tolerant to PDL, but has a small (less than 0.3 dB) penalty relative to OPD.

The key function of the Interpolator is to take the pilot tone signals, $\tilde{X}_{pH1,2}$, $\tilde{X}_{pV1,2}$ and $\tilde{Y}_{pH1,2}$, $\tilde{Y}_{pV1,2}$, for the entire channel and convert them into individual pilot tone RF signals, $\mathbf{X}_m^{H,V}$ and $\mathbf{Y}_m^{H,V}$, for each m-th subcarrier, as if those pilot tone signals were set at the central frequencies of their subcarriers and were allowed to co-propagate with the subcarriers in the optical fiber. Because the pilot tone signals, $\tilde{X}_{pH1,2}$, $\tilde{X}_{pV1,2}$ and $\tilde{Y}_{pH1,2}$, $\tilde{Y}_{pV1,2}$, set at the edges of the channel spectrum, acquire different phase shifts relative to the subcarriers located inside the channel spectrum due to CD and PMD, care has to be taken to compensate for such phase.

The CD equalization is the easiest operation by the Interpolator block because the phase shifts in the pilot tones relative to the subcarriers due to the CD are fully determined by the cumulative dispersion in the optical fiber and frequency spacing between the pilots and subcarriers. The phase shift due to the CD at frequency $\omega_n = \omega_0 + n\Omega$, where $\omega_0$ is a center light frequency of the channel and $-(N-1) \leq n \leq N-1$, is $-0.5 D_{ac}(n\Omega)^2$, where $$D_{ac} = \int_0^L \beta'' dz$$

is the cumulative dispersion, $\beta''$ is the $2^{nd}$ order dispersion coefficient at $\omega_n$.

In the $1^{st}$ step of digital processing, in the Interpolator block, one digitally compensates for the CD phase shifts in the pilot tones to produce dispersion compensated pilot tone signals:

$$\overline{X}_{pH1,2} = \tilde{X}_{pH1,2} \exp\{i 0.5 D_{ac}(6\Omega)^2\}, \overline{X}_{pV1,2} = \tilde{X}_{pV1,2} \exp\{i 0.5 D_{ac}(5\Omega)^2\}$$

and $$\overline{Y}_{pH1,2} = \tilde{Y}_{pH1,2} \exp\{i 0.5 D_{ac}(6\Omega)^2\}, \overline{Y}_{pV1,2} = \tilde{Y}_{pV1,2} \exp\{i 0.5 D_{ac}(5\Omega)^2\}.$$

These phase shifts are pre-set based on knowledge of the cumulative dispersion in the optical fiber. Once the interpolation due to PMD, described below, is done and a virtual pilot tone per m-th subcarrier is digitally created, the virtual pilot tone is phase shifted by means of its multiplication by $\exp[-i0.5\psi_0(\omega_m)]$ in order to match the phase shift in the n-th subcarrier according to equations (6b) and (7b). The digitally created virtual pilot signals, $\mathbf{X}_m^{H,V}$ and $\mathbf{Y}_m^{H,V}$, are then digital-to-analog converted by using a low speed DAC and sent to the multipliers followed by the summers which realize in the analog domain the operation shown in equation (6a).

In an OFDM based system, there are two implications of PMD: (1) the inter-subcarrier PMD resulting in different phase shifts from a subcarrier to a subcarrier and (2) the intra-subcarrier PMD resulting in signal distortion due to PMD within the bandwidth of the subcarrier. In the present disclosure, the intra-subcarrier PMD is considered to be small because of the small bandwidth (small baud rate) of the subcarrier. On the other hand, the inter-subcarrier PMD causes significant phase shifts from a subcarrier to a subcarrier. One of the key functions in the Interpolator block is to compensate for the phase shifts due to the inter-subcarrier PMD. The principles of a straightforward interpolation algorithm for inter-subcarrier $1^{st}$ order PMD compensation are described below.

In equations (6a) and (7a), $C_m^{H,V}(t) = \sqrt{P_s/2M} e^{i[\phi_m^{H,V}(t) + \Psi_m]}$, where $P_s$ is the channel power, $\phi_m^{H,V}(t)$ is the QPSK data modulation of the phase in the H and V polarized channels of the m-th subcarrier, and $\Psi_m$ is the phase of the m-th subcarrier slowly varying over time because of the RF subcarrier generator frequency drift. This phase determines the clock in the m-th subcarrier. Consequently, in order to properly demultiplex and detect the data in each m-th subcarrier, one has yet to do two things: (1) recover the clock in each m-th subcarrier set by the phase $\Psi_m$, which means compensation for this phase shift, and (2) compensate for inter-subcarrier mismatch created by receiver 12×RF subcarrier generator 24.

Both subcarrier generators at Tx and Rx operate based on a principle of harmonics generation. This means that the phase $\Psi_1$ in the fundamental 1.875 GHz tone at Tx RF subcarrier generator 24 is cascaded to higher order tones, that is $\Psi_n = |n| \Psi_1$, where $-N \leq n \leq N$ and N is the highest order of a tone generated by the RF subcarrier generator. Note that n here designates the count of the tone rather than a count the subcarrier channel. Hence, $$\Psi_m = \begin{cases} (m-5)\Psi_1, & m \geq 5 \\ (6-m)\Psi_1, & m \leq 4, \end{cases}$$

$$m = 1 \div 8,\ \Psi_{cV1,2} = 5\Psi_1,\ \Psi_{cH1,2} = 6\Psi_1.$$

Similarly, at the Rx subcarrier generator, the RF LO tone signals are $G_{LO,m} = |G_{LO}| \exp(i\theta_m)$, where $$\theta_m = \begin{cases} (m-5)\theta_1, & m \geq 5 \\ (6-m)\theta_1, & m \leq 4, \end{cases}$$

$$m = 1 \div 8,\ \theta_{cV1,2} = 5\theta_1,\ \theta_{cH1,2} = 6\theta_1,$$

i.e. $G_{LO,cV1,2} = |G_{LO}| \exp(i5\theta_1)$, $G_{LO,cH1,2} = |G_{LO}| \exp(i6\theta_1)$ and $\theta_1$ is the phase of the fundamental 1.875 GHz tone at the Rx RF subcarrier generator.

Both the subcarrier clock recovery and compensation for inter-subcarrier phase mismatch in receiver the 12×RF subcarrier generator 24 are achieved digitally in the Interpolator block 33, 34, 35, and 36 using a low speed DSP in two steps: (1) the clock recovery, set by the phase $\Psi_1$, is realized by digitally multiplying the pilot tone signals of the left hand side H-pol. pilot times the complex conjugate of the left hand side V-pol. pilot—because these two pilot tone signal are separated by one subcarrier spacing, such product contains a net phase term $\exp(i\Psi_1)$, and (2) once the clock phase $\Psi_1$ is recovered, the inter-subcarrier phase mismatch term $\exp(i\theta_1)$ is extracted from digitally multiplying the left hand side H-pol. pilot signal by the complex conjugate of the right hand side V-pol. pilot signal.

A general representation of the fiber Jones matrix in the $1^{st}$ order PMD approximation is:

$$\hat{M}_1(\omega) = \hat{R}_1 \begin{pmatrix} 1 & 0 \\ 0 & r \end{pmatrix} \begin{pmatrix} e^{i\omega\tau/2} & 0 \\ 0 & e^{-i\omega\tau/2} \end{pmatrix} \hat{R}_2^+ = \begin{pmatrix} \overline{m}_{11} & \overline{m}_{12} \\ \overline{m}_{21} & \overline{m}_{22} \end{pmatrix} \quad (A1)$$

where $$\hat{R}_1 = \begin{pmatrix} e^{i\Psi}\cos\zeta & e^{i\Psi}\sin\zeta \\ -e^{-i\Psi}\sin\zeta & e^{-i\Psi}\cos\zeta \end{pmatrix},\ \hat{R}_2 = \begin{pmatrix} e^{i\chi}\cos\xi & e^{i\chi}\sin\xi \\ -e^{-i\chi}\sin\xi & e^{-i\chi}\cos\xi \end{pmatrix},$$

$r^2 < 1$ is a PDL coefficient, $\Psi$, $\zeta$ and $\chi$, $\xi$ angles characterize the input and output pairs of the principal states of polarization (PSPs), respectively, and $\tau$ is the differential group delay between the PSPs. It is clear from equation (A1) that the Jones matrix elements $\overline{m}_{ij}(\omega)$ may be represented as:

$$\overline{m}_{ij}(\omega) = C_1^{ij} e^{i\omega\tau/2} + C_2^{ij} e^{-i\omega\tau/2}, \quad (A2)$$

where the coefficients $C_{1,2}^{ij}$, where $i,j = \{1,2\}$, depend only on the $\Psi$, $\zeta$ and $\chi$, $\xi$ angles and PDL coefficient r and do not depend on frequency $\omega$. For a given ij-th element, the coefficients $C_{1,2}^{ij}$ are determined by the Jones matrix elements $\overline{m}_{ij}(\omega_{pH1})$ and $\overline{m}_{ij}(\omega_{pH2})$, $$\overline{m}_{ij}(\omega_{pH1}) = C_1^{ij} e^{i\omega_{pH1}\tau/2} + C_2^{ij} e^{-i\omega_{pH1}\tau/2},$$

$$\overline{m}_{ij}(\omega_{pH2}) = C_1^{ij} e^{i\omega_{pH2}\tau/2} + C_2^{ij} e^{-i\omega_{pH2}\tau/2},$$

from which $$C_1^{ij} = \frac{\overline{m}_{ij}(\omega_{pH1}) e^{i\omega_{pH1}\tau/2} - \overline{m}_{ij}(\omega_{pH2}) e^{i\omega_{pH2}\tau/2}}{e^{i\omega_{pH1}\tau} - e^{i\omega_{pH2}\tau}}, \quad (A3)$$

$$C_2^{ij} = \frac{\overline{m}_{ij}(\omega_{pH1}) e^{-i\omega_{pH1}\tau/2} - \overline{m}_{ij}(\omega_{pH2}) e^{-i\omega_{pH2}\tau/2}}{e^{-i\omega_{pH1}\tau} - e^{-i\omega_{pH2}\tau}}.$$

Substituting $C_{1,2}^{ij}$ from equation (A3) into equation (A2), one finds, instead of equation (A3) above, the following formulas for the accurate interpolation of the $1^{st}$ column Jones matrix elements $\overline{m}(\omega_m)$ and $\overline{m}_{21}(\omega_m)$ $$\overline{m}_{11}(\omega_m) = \alpha_{Hm} \overline{m}_{11}(\omega_{pH1}) + \beta_{Hm} \overline{m}_{11}(\omega_{pH2}), \quad (A4)$$
$$\overline{m}_{21}(\omega_n) = \alpha_{Hm} \overline{m}_{21}(\omega_{pH1}) + \beta_{Hm} \overline{m}_{21}(\omega_{pH2}),$$

where $$\alpha_{Hm} = \frac{e^{i\omega_m\tau/2} - e^{i(\omega_{pH2}\tau - \omega_m\tau/2)}}{e^{i\omega_{pH1}\tau} - e^{i\omega_{pH2}\tau}} e^{i\omega_{pH1}\tau/2}, \quad (A5)$$

$$\beta_{Hm} = \frac{e^{i(\omega_{pH1}\tau - \omega_m\tau/2)} - e^{i\omega_m\tau/2}}{e^{i\omega_{pH1}\tau} - e^{i\omega_{pH2}\tau}} e^{i\omega_{pH2}\tau/2}.$$

In a similar way, one finds the interpolation coefficients $\alpha_{Vm}$ and $\beta_{Vm}$, which also determine the Jones matrix elements $\overline{m}_{ij}(\omega_m)$, but through $\overline{m}_{ij}(\omega_{pV1})$ $\overline{m}_{ij}(\omega_{pV1})$ and $\overline{m}_{ij}(\omega_{pV2})$ as:

$$\overline{m}_{ij}(\omega_m) = \alpha_{Vm} \overline{m}_{ij}(\omega_{pV1}) + \beta_{Vm} \overline{m}_{ij}(\omega_{pV2}), \quad (A6)$$

where the coefficients $\alpha_{Vm}$ and $\beta_{Vm}$ are defined as:

$$\alpha_{Vm} = \frac{e^{i\omega_m\tau/2} - e^{i(\omega_{pV2}\tau - \omega_m\tau/2)}}{e^{i\omega_{pV1}\tau} - e^{i\omega_{pV2}\tau}} e^{i\omega_{pV1}\tau/2}, \quad (A7)$$

$$\beta_{Vm} = \frac{e^{i(\omega_{pV1}\tau - \omega_m\tau/2)} - e^{i\omega_m\tau/2}}{e^{i\omega_{pV1}\tau} - e^{i\omega_{pV2}\tau}} e^{i\omega_{pV2}\tau/2}.$$

From equations (A6) and (A7), one finds the following formulas for the accurate interpolation of the $2^{nd}$ column Jones matrix elements $\overline{m}_{21}(\omega_m)$ and $\overline{m}_{22}(\omega_m)$:

$$\overline{m}_{12}(\omega_m) = \alpha_{Vm} \overline{m}_{12}(\omega_{pV1}) + \beta_{Vm} \overline{m}_{12}(\omega_{pV2}),$$

$$\overline{m}_{22}(\omega_m) = \alpha_{Vm} \overline{m}_{22}(\omega_{pV1}) + \beta_{Vm} \overline{m}_{22}(\omega_{pV2}). \quad (A8)$$

It is easy to see that, for the small DGD, $(\omega_{pH2} - \omega_{pH1})\tau \ll 1$, the accurate interpolation formulas (A5) and (A7) reduce to the linear interpolation formulas, respectively, that is, $\alpha_{Hm} \to a_{Hm}, \alpha_{Vm} \to a_{Vm}$ and $\beta_{Hm} \to b_{Hm}, \beta_{Vm} \to b_{Vm}$, where:

$$a_{Hm} = \frac{\omega_{pH2} - \omega_m}{\omega_{pH2} - \omega_{pH1}}, \quad b_{Hm} = 1 - a_{Hm}, \quad (A9)$$

and $$a_{Vm} = \frac{\omega_{pV2} - \omega_m}{\omega_{pV2} - \omega_{pV1}}, \quad b_{Vm} = 1 - a_{Vm}, \quad (A9)$$

From equation (A4) and relations coupling the Jones matrix elements at the H-pol. pilot tone frequencies to the pilot tone signals $\vec{X}_{pH1,2}$ and $\vec{y}_{pH1,2}$, one may couple the $1^{st}$ column matrix elements $\overline{m}_{11}(\omega_m)$ and $\overline{m}_{21}(\omega_m)$ to the interpolated (virtual) pilot tone signals $\vec{X}_{Hm}$ and $\vec{y}_{Hm}$:

$$\overline{m}_{11}(\omega_m) = \frac{1}{G_{LO}^*} \sqrt{\frac{2}{P_c P_{LO}}} \vec{X}_{Hm} e^{-i\Phi_1}, \quad (A10)$$

$$\overline{m}_{21}(\omega_m) = \frac{1}{G_{LO}^*} \sqrt{\frac{2}{P_c P_{LO}}} \vec{y}_{Hm} e^{-i\Phi_1},$$

where $G_{LO}$ is a complex amplitude of the RF local oscillator field, $P_c$ is the power of each pilot tone in each polarization channel, and $P_{LO}$ is the optical LO power, $$\vec{X}_{Hm} = \alpha_{Hm} \vec{X}_{pH1} + \beta_{Hm} \vec{X}_{pH2},$$

$$\vec{y}_{Hm} = \alpha_{Hm} \vec{y}_{pH1} + \beta_{Hm} \vec{y}_{pH2}.$$

$$\Phi_1 = \frac{\delta}{2} + \rho + \theta - \frac{\Phi_{LOx} + \Phi_{LOy}}{2},$$

$\delta$ is the relative phase offset between the carriers in the horizontal and vertical polarization channels at the fiber input caused by different light paths from the source laser to the polarization beam combiner, $\rho$ is the phase of the central subcarrier frequency component at the fiber input, $\theta = (\delta_x + \delta_y)/2$, $\delta_x$ and $\delta_y$ are the phases of x-polarized signal component $E_{sx}$ and y-polarized signal component $E_{sy}$ at the input of the x- and y-hybrids respectively, $\Phi_{LOx,y}$ are the phases x- and y-polarized components of the LO at the x- and y-hybrids respectively. Similarly, from equation (A8) and relations coupling the Jones matrix elements at the V-pol. pilot tone frequencies to the pilot tone signals $\vec{X}_{pV1,2}$ and $\vec{y}_{pV1,2}$, one may couple the $2^{nd}$ column matrix elements $\overline{m}_{12}(\omega_m)$ and $\overline{m}_{22}(\omega_m)$ to the interpolated (virtual) pilot tone signals $\vec{X}_{Vm}$ and $\vec{y}_{Vm}$:

$$\overline{m}_{12}(\omega_m) \frac{1}{G_{LO}^*} \sqrt{\frac{2}{P_c P_{LO}}} \vec{X}_{Vm} e^{-i\Phi_1}, \quad (A11)$$

$$\overline{m}_{22}(\omega_m) = \frac{1}{G_{LO}^*} \sqrt{\frac{2}{P_c P_{LO}}} \vec{y}_{Vm} e^{-i\Phi_1},$$

where $$\vec{X}_{Vm} = \alpha_{Vm} \vec{X}_{pV1} + \beta_{Vm} \vec{X}_{pV2},$$

$$\vec{y}_{Vm} = \alpha_{Vm} \vec{y}_{pV1} + \beta_{Vm} \vec{y}_{pV2}.$$

Thus, the present disclosure addresses all of the above shortcomings simultaneously, and provides a robust and flexible architecture to accommodate scalable channel data rate increase. It is the ability to arbitrarily tradeoff the number of subcarriers versus the bandwidth of those subcarriers without the loss of spectral efficiency that results from traditional DWDM approaches that provides robustness in the proposed scheme. Benefits of the disclosure include the following, as examples: (1) minimized electronic processing, achievable either in analog or digital domains; (2) support for sufficient impairment compensation (chromatic and polarization mode dispersion, polarization demultiplexing); (3) open-loop compensation for ultra-fast polarization tracking with sub-microsecond speeds; (4) low-power feed-forward, low-cost digital computation block for channel impairment filter coefficient computations; (5) ability to improve nonlinear tolerance via pilot-tone based processing; (6) ability to use available, realistic electro-optic bandwidth components without additional interference penalties, enabling avoidance of extremely wide bandwidth electro-optical, electrical, and DSP components; (7) scalability to wide channel bandwidth, in excess of 100 Gbps, and targeting 1000 Gbps and higher; (8) reduction in total number of orthogonal carriers, which has been shown to reduce composite signal peak/average power ratio (PAPR), and increase nonlinear immunity; (9) elimination of guard bands between subcarriers, providing a substantial spectral efficiency improvement; (10) highly integrated CMOS based implementations for low cost and low footprint; (11) direct integration of electronic and optical functions on the same die or multi-chip module; and (12) provides an increase in spectral efficiency over conventional WDM systems.

Although the present disclosure has been illustrated and described herein with reference to preferred embodiments and specific examples thereof, it will be readily apparent to those of ordinary skill in the art that other embodiments and examples may perform similar functions and/or achieve like results. Likewise, it will be apparent that other applications of the disclosed technology are possible. All such equivalent embodiments and examples are within the spirit and scope of the present disclosure, are contemplated thereby, and are intended to be covered by the following claims.

What is claimed is:

1. A polarization multiplexed optical system, comprising:
   a transmitter configured to transmit a polarization multiplexed signal and to insert a pilot tone as a state of polarization reference for the polarization multiplexed signal; and
   a receiver communicatively coupled to the transmitter and configured to extract the pilot tone and correspondingly detect the polarization multiplexed signal based on the extracted pilot tone;
   wherein detecting the polarization multiplexed signal based on the extracted pilot tone comprises extracting X and Y components of each of a vertically polarized and horizontally polarized pilot tone, with the X and Y components being polarization axes of a polarization beam splitter at the receiver, and processing the X and Y components, each being low speed signals, with a low speed interpolator digital signal processing block.

2. The polarization multiplexed optical system of claim 1, wherein one pilot tone is inserted at the Horizontal polarization and one pilot tone is inserted at the Vertical polarization and they are separated in the frequency domain for proper extraction.

3. The polarization multiplexed optical system of claim 1, wherein the pilot tone is down-converted in frequency in an analog domain and then processed digitally in an interpolator block.

4. The polarization multiplexed optical system of claim 1, wherein detecting the polarization multiplexed signal based on the extracted pilot tone comprises:
   mixing the polarization multiplexed signal with a local oscillator using a hybrid to generate a radio frequency signal.

5. The polarization multiplexed optical system of claim 4, wherein extracting H and V polarization components comprises;
   mixing the radio frequency signal from the hybrid with a radio frequency local oscillator;
   for each of the pilot tones, the frequency of the radio frequency local oscillator is chosen such that the mixing product converts the radio frequency signal to baseband; and
   applying low pass filtering such that the contents of H and V pilot tones are separately extracted.

6. The polarization multiplexed optical system of claim 1, wherein signals in each polarization comprise a single-subcarrier or multiple-subcarrier-type signal with Quadrature Amplitude Modulation format in each of the subcarriers.

7. The polarization multiplexed optical system of claim 6, wherein the polarization multiplexed signal comprises a plurality of data subcarriers each at a baud rate, wherein the baud rate is selected to be between a highest rate supportable by circuitry and a lowest rate required to minimize Chromatic Dispersion and Polarization Mode Dispersion processing.

8. The polarization multiplexed optical system of claim 7, wherein each of the plurality of data subcarriers is preferentially Offset Quadrature Amplitude Modulated.

9. The polarization multiplexed optical system of claim 7, wherein one or more of the plurality of data subcarriers is Orthogonally Frequency Division Multiplexed.

10. The polarization multiplexed optical system of claim 1, further comprising:
    analog data path processing in the receiver, wherein the analog data path processing comprises low frequency signals outside of a data path that are digitized and processed in a low speed, low power digital block to determine circuit calibration and channel impairment processing coefficients.

11. The polarization multiplexed optical system of claim 10, further comprising digital processing of pilot tone signals to enable the compensation of signal impairments.

12. The polarization multiplexed optical system of claim 1, wherein the receiver is configured to provide a feed forward, single computation recovery of polarizations, allow for polarization recovery after an abrupt polarization change, and a feed forward compensation of polarization dependent loss.

13. A polarization multiplexed optical method, comprising:
    inserting a pilot tone as a state of polarization reference for a polarization multiplexed signal;
    transmitting the polarization multiplexed signal with the pilot tone;
    receiving the polarization multiplexed signal with the pilot tone; and
    detecting the polarization multiplexed signal using the pilot tone;
    wherein detecting the polarization multiplexed signal using the pilot tone comprises extracting X and Y components of each of a vertically polarized and horizontally polarized pilot tone, with the X and Y components being polarization axes of a polarization beam splitter at the receiver, and processing the X and Y components, each being low speed signals, with a low speed interpolator digital signal processing block.

14. The polarization multiplexed optical method of claim 13, wherein one pilot tone is inserted at the Horizontal polarization and one pilot tone is inserted at the Vertical polarization and they are separated in the frequency domain for proper extraction.

15. The polarization multiplexed optical method of claim 14, wherein the pilot tone is down-converted in frequency in an analog domain and then processed digitally in an interpolator block.

16. A polarization multiplexed transceiver, comprising:
a transmitter;
a receiver;
circuitry within the transmitter configured to insert a pilot tone as a state of polarization reference for a polarization multiplexed signal; and
circuitry within the receiver configured to detect the polarization multiplexed signal using the pilot tone;
wherein the circuitry within the receiver is configured to detect the polarization multiplexed signal using the pilot tone by extracting X and Y components of each of a vertically polarized and horizontally polarized pilot tone, with the X and Y components being polarization axes of a polarization beam splitter at the receiver, and process the X and Y components, each being low speed signals, with a low speed interpolator digital signal processing block.

17. The polarization multiplexed transceiver of claim 16, wherein analog signal processing is used in the high rate data path and digital signal processing is used for low rate calibrations and adaptation coefficients.

18. The polarization multiplexed transceiver of claim 16, wherein signals in each polarization comprise a single-subcarrier or multiple-subcarrier-type signal with Quadrature Amplitude Modulation format in each of the subcarriers.

19. The polarization multiplexed transceiver of claim 16, wherein a plurality of data subcarriers are orthogonally frequency division multiplexed to fill a channel bandwidth defined by transmitter and receiver component bandwidths.

20. The polarization multiplexed transceiver of claim 16, wherein a speed of digital signal processing in the circuitry within the receiver is determined by a linewidth of the pilot tone.

* * * * *